(12) United States Patent
Goerge et al.

(10) Patent No.: US 9,313,089 B2
(45) Date of Patent: Apr. 12, 2016

(54) OPERATING NETWORK ENTITIES IN A COMMUNICATIONS SYSTEM COMPRISING A MANAGEMENT NETWORK WITH AGENT AND MANAGEMENT LEVELS

(75) Inventors: Juergen Goerge, Neuried (DE); Olaf Pollakowski, Berlin (DE); Henning Sanneck, München (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 649 days.

(21) Appl. No.: 12/532,494

(22) PCT Filed: Mar. 25, 2008

(86) PCT No.: PCT/EP2008/053476
§ 371 (c)(1),
(2), (4) Date: Dec. 23, 2009

(87) PCT Pub. No.: WO2008/116861
PCT Pub. Date: Oct. 2, 2008

(65) Prior Publication Data
US 2010/0103823 A1      Apr. 29, 2010

(30) Foreign Application Priority Data
Mar. 27, 2007   (EP) .................................. 07006325

(51) Int. Cl.
*H04W 4/08* (2009.01)
*H04W 28/02* (2009.01)
*H04L 12/24* (2006.01)

(52) U.S. Cl.
CPC .......... *H04L 41/0631* (2013.01); *H04L 41/044* (2013.01); *H04L 41/046* (2013.01)

(58) Field of Classification Search
CPC ........ H04W 4/08; H04W 28/02; H04W 36/15
USPC ......................... 709/202–206; 370/329–338
See application file for complete search history.

(56) References Cited

U.S. PATENT DOCUMENTS

| 6,728,688 B1 | 4/2004 | Hirsch et al. |
| 2001/0013107 A1 | 8/2001 | Lewis |

(Continued)

FOREIGN PATENT DOCUMENTS

WO    2005117347    12/2005

OTHER PUBLICATIONS

Office Action Issued from the Patent Office of the Russian Federation dated Mar. 19, 2012; Issued on corresponding Application No. 2009139637/08.

*Primary Examiner* — Brandon Renner
(74) *Attorney, Agent, or Firm* — Squire Patton Boggs (US) LLP

(57) ABSTRACT

The present invention relates to operating of network entities in a communications system, wherein said communications system comprises a management network with agent and management levels, wherein a fault and/or performance management related data provided or occurring in an agent level is correlated and/or analyzed in said agent level with further fault and/or performance management related data provided or occurring in said agent level by use of configuration management relationships in said agent level, and wherein an information derived from the correlation is transmitted to at least one management level of said management network of said communications network being responsible for management of the corresponding agent level.

17 Claims, 6 Drawing Sheets

(56) References Cited

U.S. PATENT DOCUMENTS

| | | |
|---|---|---|
| 2004/0193923 A1 | 9/2004 | Hammond et al. |
| 2005/0033816 A1* | 2/2005 | Yamaguchi et al. ........... 709/208 |
| 2005/0192011 A1* | 9/2005 | Hong et al. ................... 455/440 |
| 2005/0239465 A1* | 10/2005 | Lee et al. ...................... 455/436 |
| 2005/0240835 A1 | 10/2005 | Dragnea et al. |
| 2006/0031463 A1* | 2/2006 | Bird et al. ..................... 709/224 |
| 2006/0098578 A1* | 5/2006 | Mallya et al. ................. 370/242 |
| 2006/0116853 A1* | 6/2006 | Rappaport et al. ............ 702/182 |
| 2006/0161653 A1* | 7/2006 | Webb et al. ................... 709/224 |
| 2007/0258407 A1* | 11/2007 | Li et al. ......................... 370/331 |
| 2009/0201810 A1* | 8/2009 | Kazmi et al. .................. 370/232 |

\* cited by examiner

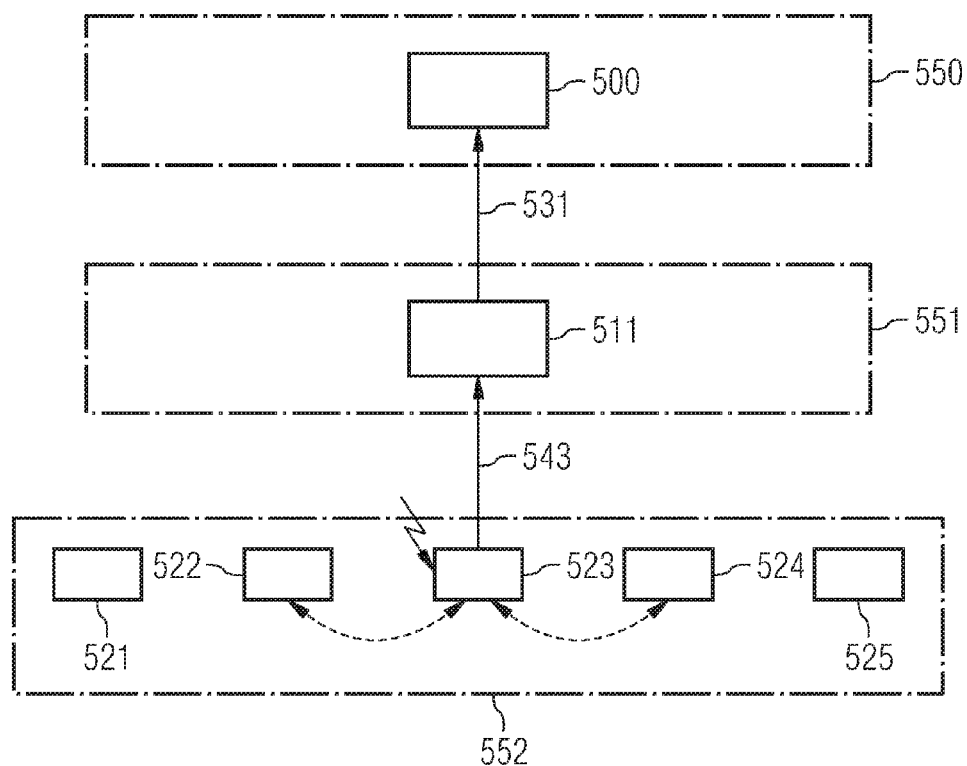

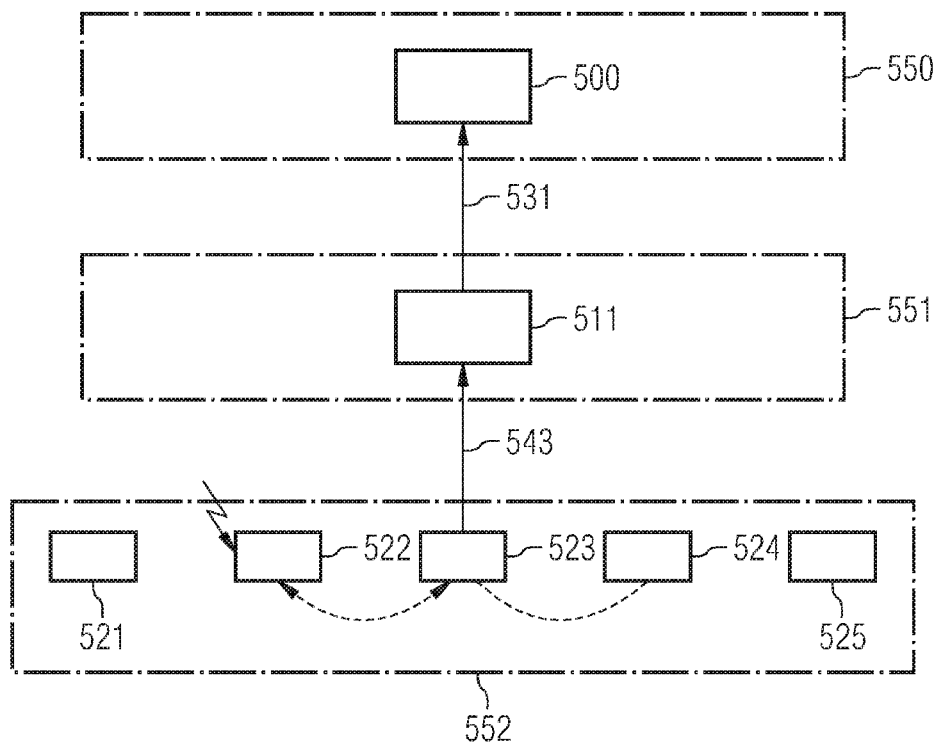

OPERATING NETWORK ENTITIES IN A COMMUNICATIONS SYSTEM COMPRISING A MANAGEMENT NETWORK WITH AGENT AND MANAGEMENT LEVELS

FIELD OF THE INVENTION

The present invention relates to operating network entities in a communications system like a (mobile) telecommunications system, said communications system comprising a management network with at least one agent and at least one management level. In particular, the operation of network entities refers to processing of fault and/or performance management related data, relevant for the operated network entities and/or caused by at least one fault and/or performance management related event. The present invention relates to a method, a program, a network entity enabling such an operation in the communications system. Further, the present invention relates also to use of the network in the communications system, wherein, in particular, fault and/or performance management related data, relevant for the operated network entities and/or caused by at least one fault and/or performance management related event is processed.

BACKGROUND OF THE INVENTION

According to the principles of a network management system, a typical management structure of a communications system, for example, of a (mobile) telecommunications system, comprises several hierarchical levels for the management of the communications system. Hierarchical level of a management network means that every level in the management network of the communications system has a certain management and/or communications system related functionality specific for this level, and that, depending on its hierarchical position in the network, it performs a certain management function. Each of these hierarchical levels, except for the top level and the first-line level, has a double management function manager—function and agent function. Each hierarchical level, except for the first-line level, has a manager function with regard to the underlying level, and every hierarchical level, except for the top level, has an agent function with regard to the level before. Thus, management of a communications system features a hierarchical structure clearly defining the functions at every hierarchical level of this communications system or of the management network of the communications system respectively.

Each level comprises corresponding entities or elements being of physical and/or abstract nature. Thus, an entity of a hierarchical level can be a software and/or hardware (device) in a communications system. In the following, such entities or elements will be referred to as "network entities". Depending on the level of the management network performing a functionality of a manager or an agent, or both, these network entities are managers, agents, or both. In the following, the terms manager and agent or management level and agent level, respectively, will be used in dependence of the functionality of the corresponding hierarchical level and, thus, in dependence of the corresponding functionality of the corresponding network entity of this hierarchical level. For this reason, if a level represents both the management and the agent level, a network entity comprised in this hierarchical level will be a manager or an agent depending on the function to be performed at a given time by this network entity.

Network management as such refers to the Operation, Administration, and Maintenance (OAM) of communications systems or networks like telecommunications networks at the top level. Network management is the execution of a variety of functions required for controlling, planning, allocating, deploying, coordinating, and/or monitoring the resources of a network, including performing functions such as initial network planning, frequency allocation, predetermined traffic routing to support load balancing, cryptographic key distribution authorization, configuration management, fault management, security management, performance management, bandwidth management, and/or accounting management. Further, in such a management system hardware and/or software are provided that support OAM functionality and provide these functions, for example, to network users and/or administrators. Thus, OAM includes facilities for operating, managing and maintaining networks.

Managers in a communications system are configured to start operations for the operation, administration and maintenance of the communications network comprising configuration, fault and/or performance management (CM, FM, and/or PM) of the communications system, for example, as mentioned above. It is done by sending requests, which are performed by the agents, in particular, by the agents assigned to the corresponding managers. The managers receive then corresponding feedbacks, called responses, from the agents.

Network entities implementing the functionality of an agent in the communications network recognize events relevant for the operation, administration and maintenance of the communications network (e.g. alarms), generate corresponding notifications, and transmit these notifications, usually as event reports, to the managers, in particular, to the managers the network entities are assigned to. In this way, network management is performed in a conventional management network of a communications system.

In the following, the above described data (e.g. alarms, notifications) caused by or being related to fault and/or performance management related events will be in general referred to as fault and/or performance management related data. An event can be seen as something mostly referring to changes in communications system, which provoke a predefined reaction or response from a network entity. Further, an event can be a cause for one or more than one subsequent events in the communications system.

The provision of OAM functionality like CM, FM and/or PM, for example, is assured by communication between the hierarchical levels of the management network of the communications system, wherein the network entities of an upper level manage the network entities of the underlying level to ensure a correct performance of the OAM functionality and the managed network entities act depending on the management of the upper management level. Further, in the management network of the communications system a strict assignment exists between managers and agents. A manager has a certain set of agents it has to manage. Agents, in turn, are assigned to one manager. Thus, the performance and safeguarding of the OAM functionality is done in a strict hierarchical way between the levels of the management network of the communications system.

CM serves the purpose of making whole networked and distributed system available, while FM and PM keeps the system operational, or restores an operational state. The most important CM tasks are inventorizing or checking and noting configurations and/or distribution of (hardware and/or software) entities, elements, and/or components of a communications system; and appropriate management to ascertain the changes applied by communications system (hardware and/or software) entity, element, and/or component distribution, and where appropriate to implement a corresponding reconfiguration. Additionally, CM is also responsible for installation of documentation and directory services.

FM comprises functions for detecting, isolating, and correcting malfunctions in a (tele-) communications system. FM and its functions compensate for environmental changes, and include maintaining and examining error logs, accepting and acting on error detection notifications, tracing and identifying faults, carrying out sequences of diagnostics tests, correcting faults, reporting error conditions, and localizing and tracing faults by examining and manipulating database information. Thus, when a fault or another FM related event, any causing initiation or implementation of at least one FM related function, occurs, a network component will often send a notification to the network operator using a protocol, such as SNMP for example. An alarm is a persistent indication of a fault that clears only when the triggering condition has been resolved.

PM, in turn, records the system load and displays performance bottlenecks and has a direct influence on network deployment, network extensions and error management. Parameters such as the response time, round trip time, and delay time are important for PM, as are the theoretical performance limits and network load. These parameters are influenced by a number of transmission characteristics such as flow control, access method, attenuation or packet loss rates. PM allows operators to monitor network load and detect performance trends for future network planning. Thus, when a performance bottleneck of another PM related event occurs in the communications system, at least one PM related function is then performed.

The communication between the hierarchical levels of a management network of a communications system and thus between the managers and the agents is usually facilitated by management interfaces, called OAM interfaces. The implementation of these interfaces can be preformed, for example, by appliance of protocols like Simple Network Management Protocol (SNMP), Transaction Language 1 (TL1), Extensible Markup Language (XML), or Common Object Request Broker Architecture (CORBA).

An example of a conventional management network of a communications system like a (mobile) telecommunications system is shown in FIG. 1, where three hierarchical levels 150, 151, 152 of such a management network of a telecommunications system are presented.

In the following, with reference to FIG. 1, FM and/or PM, being important and typical OAM functions, will be regarded in more detail.

As already outlined above, the FM and/or PM is performed by providing FM and/or PM related data from the lower levels to the upper levels, where FM and/or PM relevant or related decisions are made, and results of these decisions are then transmitted from the upper levels back to the lower levels.

At the first line level 152, the management network of a telecommunications system consists of network elements (NEs) 121, 122, 123, and 124. In the following, this hierarchical level 152 will be referred to as the "NE level". A network element (NE) 121, 122, 123, 124 is a kind of telecommunications (hardware) equipment or element that is addressable and manageable. NE can also be seen as a combination of hardware and software or a network entity comprising software that primarily performs telecommunications service functions or predefined and a priori agreed upon functions and, thus, provides support or services to users, for example. NEs 121, 122, 123, 124 are interconnected and managed through at least one Element Manager System (EMS) 111, 112 comprised in the upper management level 151, which will be referred to as the "EMS level" in the following. The NE level 152 performs the agent functionality, and the EMS level 151, in turn, performs a manager functionality with regard to the NE level 152 and an agent functionality with regard to the upper level 150 in the hierarchy of the management network.

An EMS 111, 112 is a manager of one or more of a specific type of NEs 121, 122, 123, 124 and allows to manage all the features of each NE 121, 122, 123, 124 individually. Each of the NEs 121, 122, 123, 124 is connected to one responsible and managing EMS 111, 112 via appropriate links. The communication and, thus, the exchange of OAM related data like fault and/or performance management related data or configuration management related data between the NE level 152 and the EMS level 151 and thus between the NEs 121, 122, 123, 124 and the EMS 111, 112 is ensured by special management interfaces 141, 142, 143, 144, like EMS/NE Operation and Maintenance (OAM) interfaces, implemented on the links between the NE and EMS level 152, 151. Such connections or interfaces between the EMS and NEs are called also "southbound" connections or interfaces.

EMS 111, 112, in turn, are managed by an Operations Support System (OSS) 100 of the top level 150, in the following referred to as the "OSS level". The OSS 100 monitors the underlying management layers 151, 152 and predominantly looks at functional and non-functional requirements of the communications system and of the underlying layers 131, 132. The OSS level 150 performs just a manager function with regard to the underlying EMS level 151, wherein, when considering these two levels, the EMS level performs an agent function. The communication and, thus, the exchange of OAM related data like fault and/or performance management related data or configuration management related data between the OSS level 150 and the EMS level 151 or the OSS 100 and the EMS 111, 112 respectively is enabled by links between the two levels, wherein management interfaces 131, 132, like EMS/OAM interfaces, are implemented on these links for this purpose. The connections or interfaces between the OSS level 150 and EMS level 151 are also known as "northbound" connections or interfaces.

The NM level 152 or there comprised NMs 121, 122, 123, 124 and OSS level 150 or there comprised OSS 100 monitor permanently the system performance of a live network. When problems occur countermeasures have to be taken in order to maintain the quality of service (QoS) at acceptable levels. In the conventional systems, this process involves transferring data across numerous (vertical) interfaces between hierarchical systems. Thus, if a fault and/or performance management related event like a fault occurs in a NE, fault and/or performance management related data like an alarm is sent northbound to the EM. A single (primary) fault and/or performance management related event like (primary) fault in a NE can result due to the interdependencies in the call processing area in multiple (secondary) fault and/or performance management related events like (secondary) faults in other NEs. In such a situation, all NEs impacted by a fault send alarm information northbound.

In FIGS. 2 and 3 such a situation is visualised exemplary. In FIG. 2, a fault and/or performance management related event like a fault occurs at first at NE 222. This fault and/or performance management related event or fault will be called primary fault and/or performance management related event or fault. Due to relations to NEs 223 and 224 (shown as dashed lines) from the NE 222 secondary fault and/or performance management related events, here faults, occur also at NEs 223 and 224. In FIG. 2 (and also in following figures), fault and/or performance management related events like faults are visualized by bolts. Each of the NEs 222, 223, 224 send the corresponding fault and/or performance management related data, here alarms, independently from each other to the managing EMS 211. In case of FIG. 2, all alarmed NEs 222, 223, 224 are managed by the same EM 211. These fault and/or performance management related data like alarms, in the present situation, are uncorrelated and do not provide information about the root cause. Thus, it is possible to analyse and correlate the fault and/or performance management related data, here alarm information, at the EM level (in order to extract e. g. the root cause). Otherwise this is only possible at the next level, as shown in FIG. 3.

In FIG. 3, the origin situation is similar to the situation of FIG. 2. In FIG. 3, a primary fault and/or performance management related event like a fault occurs at first at NE 322. Due to relations to NEs 323 and 324 (shown as dashed lines) from the NE 322 secondary fault and/or performance management related events, here faults, occur also at NEs 323 and 324. Each of the NEs 322, 323, 324 send the corresponding fault and/or performance management related data, here alarms, independently from each other to the managing EMS 311 and 312. However, here the alarmed NEs 322, 323, 324 are managed by different EMS. For this reason, the fault and/or performance management related data, here alarm information, is provided by the corresponding EMS 311 and 312 to the next managing level, to OSS 300, respectively, for analyzing and/or correlation purpose.

Independent of the fact, whether the situation of FIG. 2 or whether the situation of FIG. 3 becomes true, this data mining on fault and/or performance management related data (e.g. alarms) is a difficult task requiring special applications. In order to be successful the corresponding fault and/or performance management related data (alarms) has to provide sufficient information. If this is not the case (and this actually happens quite often), fault and/or performance management related data (alarms) cannot be correlated. This would e. g. mean that the root cause analysis fails.

The above described situations and, thus, the conventional FM and/or PM provide the following disadvantage that all fault and/or performance management related data has to be transferred to a higher level (e.g. EM and/or OSS). This requires bandwidth and processing power. Further, only raw unprocessed information is sent by the agents of an agent level like NEs or EMs to the next managing level like EMS level or OSS level. The next managing level has to extract relationships between the received fault and/or performance management related data like alarms, root causes etc.

Furthermore, in case the fault and/or performance management related data do not provide sufficient information on the reported fault and/or performance management related event, it is not possible to find out the root cause. Additionally, the process of correct conventional fault and/or performance management securing is slow and does not allow for a fast reaction or response to network problems, with the known implications (reduced QoS, customer satisfaction decreases, etc.).

Because of the huge amounts of data to be transferred between the different management levels, the process of correct conventional fault and/or performance management securing is typically not automated. Thus, the operator has to analyze the fault and/or performance management related data by himself and also take corrective actions by himself. This task may be assisted of course by some applications, but these applications have then to be provided by the operator or a systems integrator. These parties typically do not have the in-depth knowledge of the different agents like NEs required to do the correlation of fault and/or performance management related data. For this reason, the process is often error-prone because some correlation is lost, when data is being passed upwards from the lower agent levels to the upper managing levels (e.g. from NE level to EMS level and/or from EMS level to OMS level).

SUMMARY OF THE INVENTION

It is an object of the present invention to improve operation of network entities in a communications system comprising a management network with agent and management levels.

This object is achieved by a method of operating network entities in a communications system, wherein said communications system comprises a management network comprising agent and management levels, wherein a fault and/or performance management related data occurring or provided in an agent level is correlated in said agent level with further fault and/or performance management related data occurring or provided in said agent level by use of configuration management relationships in said agent level, and wherein an information derived from the correlation is transmitted to a management level of said management network of said communications network responsive for management of the agent level.

Here, it has to be noted, that, for sake of conciseness, the data or information derived during the correlation (in connection with an analysis of the corresponding fault and/or performance management related data) often will be referred to as correlation data in the following. However, this correlation data has to be seen as comprising any information derived during said correlation and/or analysis of the corresponding fault and/or performance management related data. Further, when transmitting the information derived from the correlation or the correlated data, as explained above, to a management level, according to the embodiments of the present invention this (at least one) management level will be often the level responsible for the management of the corresponding agent level. The transmitted information will or can then be analysed and/or processed at the management level in a way to enable a well functioning FM and/or PM.

Further, this object is achieved by a computer program product comprising code means for producing the steps of the method as outlined shortly above. Optionally, the computer program can be embodied in a computer-readable medium.

Furthermore, this object is achieved by a network entity for operation in an agent level of a management network of a communications system, wherein said network entity is configured to: receive fault and/or performance management related data provided or occurring in said agent level by use of at least one configuration management relationship in said agent level; correlate said fault and/or performance management related data with own fault and/or performance management related data occurring in said agent level; and transmit an information derived from the correlation or correlated data as defined above, respectively, to a (next) management level of said management network of said communications network responsive for management of the agent level.

Additionally, this object is achieved by use of the network entity of an agent level of a management network of a communications system, as outlined shortly above, to correlate fault and/or performance management related data by use of at least one configuration management relationship and to transmit information derived from the correlation or correlated data, as defined above, to a (next) management level of said management network of said communications network responsive for management of the agent level.

Furthermore, this object can also be achieved by use of the method in an agent level of a management network of a communications system, as outlined shortly above, to correlate fault and/or performance management related data by use of at least one configuration management relationship and to transmit information derived from the correlation or correlated data, as defined above, to a (next) management level of said management network of said communications network responsive for management of the agent level.

When turning back to the prior art examples provided by FIG. 1-3, it can be summarized that the proposed solution provides an efficient mechanism, which can be implemented in an effective and easy way, to correlate fault and/or performance management related data like alarms directly in the agent level, where a primary fault and/or performance management related event like a fault occurred.

According to various embodiments, CM relationships of the agent level are exploited to enable an effective correlation and/or analysis of fault and/or performance management related data like alarms. These CM relationships will be usually be the CM relationships between the entities being affected by the primary fault and/or performance management related event. Thus, when considering the examples provided by FIGS. 2 and 3, the CM relationships, which will be used in the embodiments, are represented as dashed lines between the network entities 222 and 223, 222 and 224, 322 and 323, 322 and 324. As exemplary represented in FIG. 1 such CM relationships 161, 162, 163, 164, 165, 166, 171 can be provided and used in the embodiments in several agent levels 152, 151 of a management network of a communications system. When considering the NE level 152, 252, 352 of FIGS. 1-3, such CM relationships are often implemented in the prior art by special management interfaces referred to as Inter-NE OAM interfaces. When considering the EMS level 151, 251, 351 of FIG. 1-3, such CM relationships are often implemented in the prior art by special management interfaces referred to as EMS/EMS OAM or west-/eastbound interfaces.

According to an embodiment, these special management interfaces, outlined shortly above, can be used. Thus, the proposed implementation of saves the use of additional implementation of additional interfaces.

In general, in the CM area it is very common that data sets have to be configured consistently in different NEs. The conventional CM relationships between these data sets can be classified into two types: master-slave-relationships and peer-to-peer-relationships. However, this classification should not be seen as being restrictive.

A master-slave relationship means that only the master entity can manipulate a certain configuration data set. Thus, when a data set is changed the change is forwarded to all slave entities which have a copy of the master data.

In a peer-to-peer relationship every entity which holds the configuration data set can modify it. The changes at one peer are thus propagated to all other peers which have the same data set stored.

The logical relationship can be caused by geographical (e.g. adjacent base stations) or topological (e.g. routers which are connected to each other) facts.

An example for CM relationship provided by a master-slave-relationship can be demonstrated by a handover in 3G Mobile Networks. There, for example, a radio network controller or RNC (RNC_A) manages a first cell (CELL_A). CELL_A has a handover relationship or adjacency to a second cell (CELL_B). Cell_B, in turn, is managed by a second network entity, a second RNC (RNC_B). In the present scenario, RNC_A has to mirror a subset of the cell data of CELL_B. The master data set of CELL_B is stored in RNC_B. The relationship between the subset of the data of CELL_B in RN_A and the cell data of CELL_B in RNC_B is a master-slave relationship, because if cell data of CELL_B in RNC_B is changed all dependent data sets (like the data in RNC_A) have to be changed accordingly. This relationship between RNC_A and RNC_B has a corresponding relationship between the managed objects representing these NEs.

An example for CM relationship provided by a peer-to-peer-relationship can be demonstrated by link termination points. There, two network entities NE_A and NE_B are connected via a communications link. The endpoints of the link (link termination points) are denoted LTP_A and LTP_B. LTP_A and LTP_B have to be configured consistently (e. g. with regard to the bandwidth). If either of the two termination points is changed, the respective other termination point has to be changed as well. Hence, there is a peer-to-peer relationship between them. The relationship has a corresponding relationship between the managed objects representing LTP_A an LTP_B. The managed objects are residing in the EMS.

Network entities (e.g. NEs, EMS) being involved in a CM relationship are interacting in the call processing area and are hence dependent on the current functional state of the respective other network entities (e.g. NEs, EMS). The faster a network entity gets this information about the other network entity the faster it can react to it, thereby minimizing the impact on the quality of service.

Thus, the local knowledge on CM relationships is exploited or used to correlate performance and/or fault management related data (like alarms as shown above) locally and send only a single message with richer information (e. g. a summary report of the problems) to the next higher management level (instead of sending performance and/or fault management related data (like an alarm) from each individual NE impacted by a performance and/or fault management related event (like a fault) at another NE).

Handling performance and/or fault management related data caused by at least one performance and/or fault management related event directly, as outlined above, provides the advantage that in general the amount of the performance and/or fault management related data to be sent to the next management level can be reduced. Thus, a more compact data is sent after a corresponding correlation in the corresponding agent level. In this way, by reducing the number of data to be sent from the agent level to the managing level (e.g. messages from NE to the EMS or from EMS to OSS) the required network bandwidth can be reduced. Additionally, less tools (for correlation/post-processing of performance and/or fault management related data (like alarms and performance data)), and thus less processing power, are required at the next management level (like EMS and/or OSS levels). This also increases the speed of the whole alarming and performance assessment process, thus, of the whole PM and/or FM.

Consequently, a faster propagation of information is enabled, as fewer amount of performance and/or fault management related data (e.g. messages) need to be processed by the higher management levels containing more value-add (pre-correlated) information.

Additionally, a higher level of automation of PM and/or FM is enabled. In some cases it may be possible to resolve an issue (FM/PM or alarm/performance problem) directly when the correlation is done locally. Thus, a kind of "self-healing" or "self-optimization" with regard to FM and/or PM is provided. Thus, the issue does not need to be escalated at all to the next higher level in the management hierarchy (EMS or OSS respectively), but can resolved at the lower level. This reduces the requirements to the higher level.

Further, lower-level management hierarchy knowledge is exploited more intensive: the proposed method operates at the lower agent level (e.g. NE and/or EMS level) provided by network equipment providers rather than system integrators or the operators themselves. Therefore, the full knowledge about the specifics of a certain network entity of the corresponding agent level (e.g. NE) can be exploited, rather than trying to resolve problems specific for the corresponding network entities (e.g. NEs) at a too high level of the management hierarchy, where some knowledge available at the lower levels may be not available any more.

Furthermore, a property of distributedness is provided. The proposed method is particular suitable for next generation networks with a high degree of distribution. This is, e.g., the case for 3G LTE, where direct interfaces between the NE (where FM/PM data is generated) exist.

In summary, the management process (in particular FM and/or PM process) can be faster, more automated and consumes less resources. All this improves the resolution of customer problems and reduces the operational expenditures (OPEX) of the operator.

According to one embodiment, the fault and/or performance management related data is correlated at one network entity of the agent level. Further, also the transmission of the correlated data to the next management level can be implemented by the one network entity. This fact provides the advantage, that the processing (analyzing and/or correlating) of the corresponding FM and/or PM data is performed coordinately, just by one responsive network entity. Thus, no specific or complex processing of data between several network entities of the corresponding agent level is required.

When considering a primary event and at least one secondary event, the whole FM and/or PM related data to be correlated can be seen as being comprised of one FM and/or PM related data and further FM and/or PM related data. The FM and/or PM related data can be data occurring at said one network entity and said further FM and/or PM related data can be data occurring at at least one further network entity of said agent level, wherein said one network entity has at least one CM relationship to the at least one further network entity in said level.

If the CM relationship is a peer-to-peer-relationship, according to an embodiment, this one network entity will be a network entity at which a primary FM and/or PM related event occurs, and wherein this FM and/or PM related event will be a cause for the one FM and/or PM related data, and wherein said further fault and/or performance management related data is sent to said one network entity by said at least one further network entity to which said one network entity has the peer-to-peer-relationship as reaction or in response to said fault and/or performance management related event. With other words, this event will be a primary event causing at least one further secondary event and the corresponding FM and/or PM related data at the network entities affected by these events.

If the configuration management relationship is a master-slave-relationship, according to an embodiment, said one network entity, at which the FM and/or PM related data will be correlated, will be the master entity of this relationship.

Here, if a (primary) FM and/or PM related event occurs at the master entity, said FM and/or PM related event is cause for said FM and/or PM related data and said further FM and/or PM related data, and said further FM and/or PM related data is sent to said master entity by said at least one further network entity as reaction or in response to said FM and/or PM related event. The at least one further network entity will be a slave entity of the corresponding master-slave-relationship.

However, if a (primary) a FM and/or PM related event occurs at said at the one further network entity being a slave entity of the master entity in the master-slave-relationship, said FM and/or PM related event is cause for said FM and/or PM related data and said further FM and/or PM related data, and said slave entity sends said further fault and/or performance management related data to said master entity Thus, when considering a network entity in a peer-to-peer-relationship, configured to correlate FM and/or PM related data and to transmit the correlated data to the (next) management level, the network entity will be a network entity at which a (primary) FM and/or PM related event occurs, said FM and/or PM related event being a cause for said FM and/or PM related data and said further FM and/or PM related data, and said network entity will be configured to receive said further FM and/or PM related data from at least one further network entity of said agent level having the peer-to-peer-relationship with the network entity.

In case of a master-slave-relationship, the network entity outlined above will be a master entity of the master-slave-relationship. If a (primary) FM and/or PM related event should occur at the network entity, the FM and/or PM related event will be a cause for the FM and/or PM related data and the further FM and/or PM related data, and said network entity is then configured to receive the further FM and/or PM related data from at least one further network entity of said agent level having said master-slave-relationship with said network entity and being a slave in the master-slave-relationship. However, if a fault and/or performance management related event occurs at a further network entity of said agent level, the further network entity being a slave of the network entity, the FM and/or PM related event will be cause for the FM and/or PM related data and the FM and/or PM related data, as in the previous case, and the network entity is then configured to receive the further FM and/or PM related data from the further network entity.

Thus, in comparison with the peer-to-peer-relationship, where the network entity responsible for configuration of FM and/or PM related data will be the entity at which a primary FM and/or PM related event occurs, in master-slave-relationship the network entity will be always be the master entity, independently of whether a primary FM and/or PM related event occurred at a master or at a slave entity.

BRIEF DESCRIPTION OF THE DRAWINGS

The present invention will be more clearly understood from the following description of embodiments read in conjunction with the attached drawings, in which:

FIG. 5a presents an implementation of FM and/or PM in a management network in a communications system according to an embodiment, where master-slave-relationship is exploited; and FIG. 5b presents an implementation of FM and/or PM in a management network in a communications system according to a further embodiment, where master-slave-relationship is exploited.

DESCRIPTION OF THE PREFERRED EMBODIMENTS

In the following the present invention will be explained in more detail by presenting the steps of the methodology for operating network entities in a management network of a communications system according to various embodiments.

Figure 4:
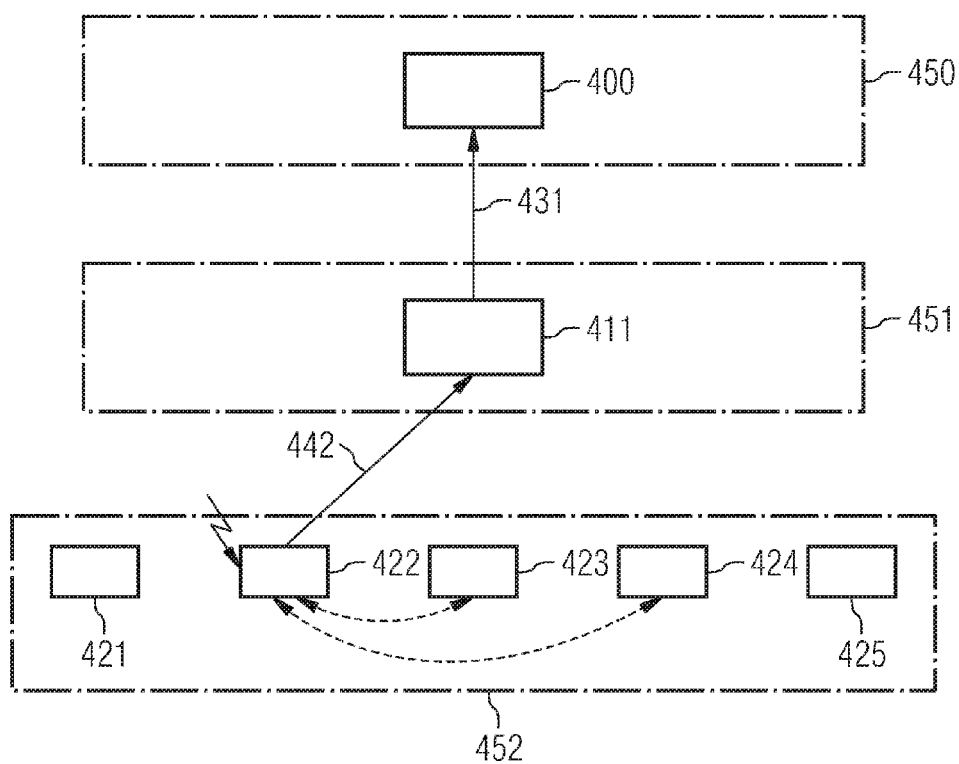
FIG. 4 presents an implementation of FM and/or PM in a management network in a communications system according to an embodiment, where peer-to-peer-relationship is exploited.

FIG. 4 presents an implementation of FM and/or PM in a management network in a communications system according to an embodiment, where peer-to-peer-relationship is exploited. In FIG. 4, the NEs 422 and 423 and the NEs 422 and 424 have peer-to-peer-relationships, visualised as dashed arrows, in the NE level 452. If a (primary) FM and/or PM related event like a fault (represented by a bolt) occurs at the NE 422 in the NE level 452, due to the knowledge about the relationship, the FM and/or PM related data occurring in response to the event at the NE 422 and the FM and/or PM related data occurring in response to the event at the NEs 423 and 424 are analyzed and/or correlated at the NE 422 in the NE level 452. Thus, the NE 422 receives the corresponding FM and/or PM related data by use of the corresponding peer-to-peer-relationships from the NEs 423 and 424. After that, in a next step the correlated data can be send for example as a single FM and/or PM related message (e.g. alarm message), indicating that all three NEs 422, 423, 424 are affected, by the NE 422 to the next management level 451, to the corresponding managing EMS 411. Due to the nature of the data involved in the relationship, NE 422 can deduct the repercussion of its FM and/or PM related event, here a fault, on NEs 423 and 424 and report this in a FM and/or PM related notification (here an alarm notification) sent northbound.

Figure 2:
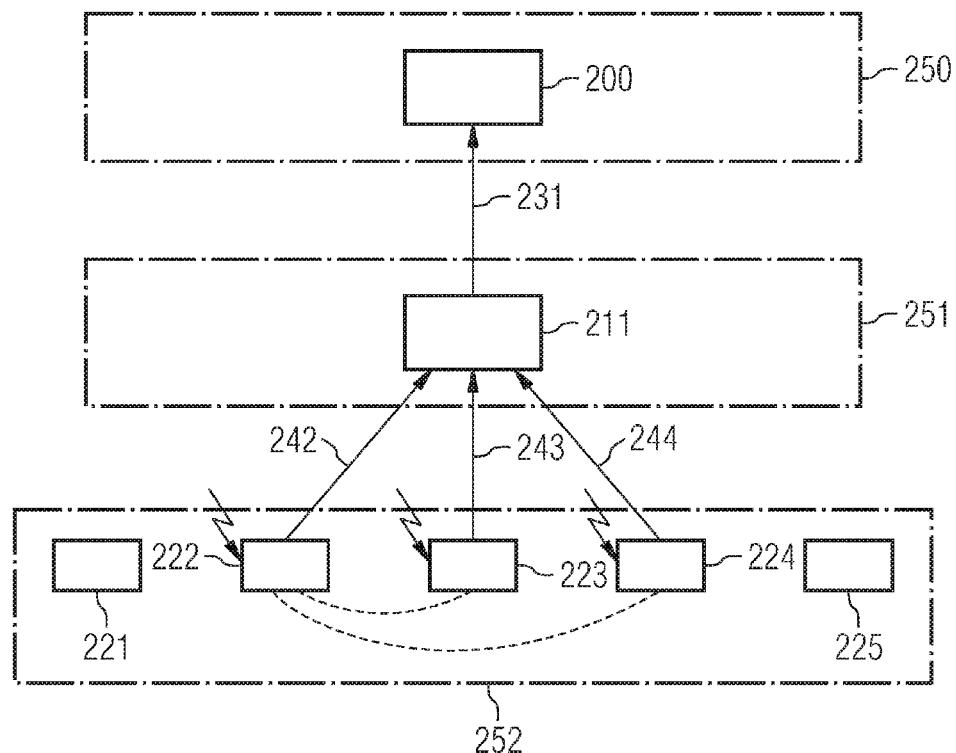
FIG. 2 presents a conventional FM and/or PM in a conventional management network in a communications system.
Figure 3:
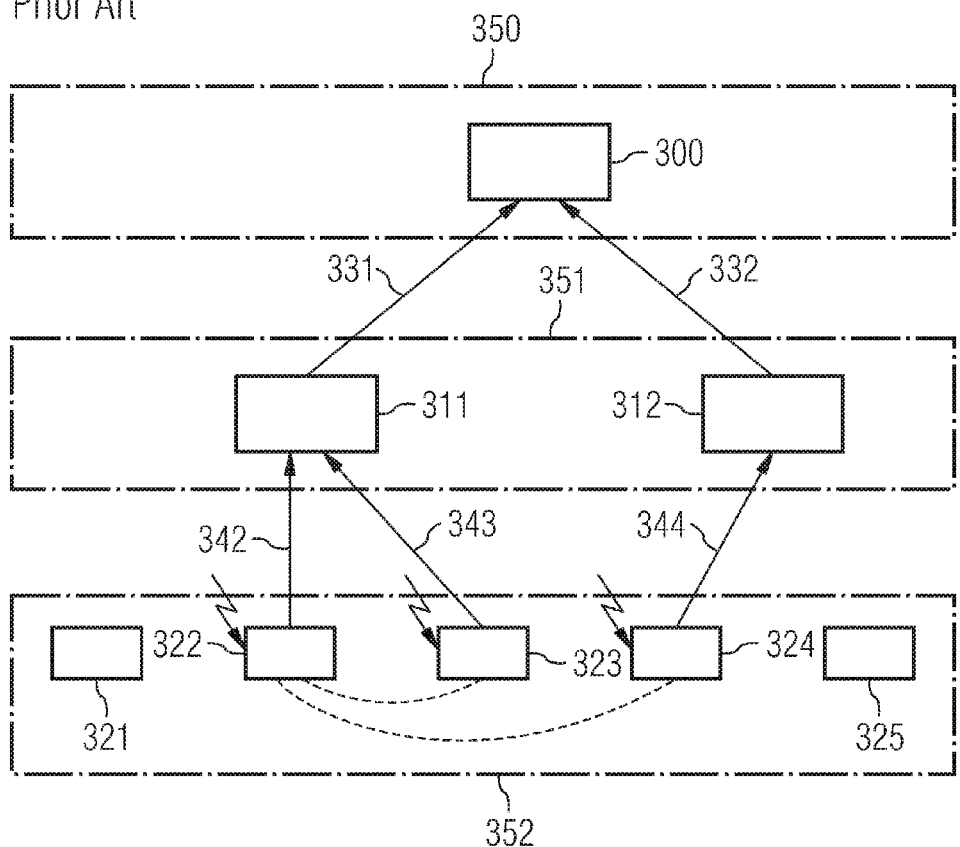
FIG. 3 presents a conventional FM and/or PM in a conventional management network in a communications system.

The NEs 423 and 424, in turn, will detect themselves some problems due to the FM and/or PM related event (fault) in the NE 422. However, they shall suppress sending corresponding FM and/or PM related data northbound, as it would be the case in a conventional FM and/or PM presented by FIGS. 2 and 3, because they are informed of the FM and/or PM related event (fault) in the NE 422 via corresponding FM and/or PM related notifications (here alarm notifications) sent horizontally to them by the alarmed NE 422. Thus, the conventional peer-to-peer-relationship is used to enable an efficient and flexible FM and/or PM.

FIG. 5a presents an implementation of FM and/or PM in a management network in a communications system according to an embodiment, where master-slave-relationship (shown by dashed arrows) is exploited and where FM and/or PM related event like a fault occurs at the master entity 523 (represented by a bold frame).

In FIG. 5a master-slave-relationships between the NEs 523 and 522 and between the NEs 523 and 524 are provided in the corresponding NE level 552. According to the embodiment, a FM and/or PM related event like a fault occurs at the master entity 523. The master entity 523 receives FM and/or PM related data (here alarms) caused by the event (here fault) from the NEs 522 and 524, analyzes and/or correlates the received data with the own FM and/or PM related data occurred as reaction or in response to the event, and sends the correlated data as a combined FM and/or PM related message (here alarm message) to the corresponding managing EMS 511 of the next managing level 551 (EMS level). This combined FM and/or PM related (alarm) notification indicates that not only the master entity 523 is affected by the FM and/or PM related event (here fault) but also functions in the NEs 522 and 524. From the type of configuration data in the master-slave-relationship the NE 523 knows which functions are affected in the slave entities NE 522 and 524 and can report this in the corresponding FM and/or PM related message (here alarm message).

Also in this case NE 522 and NE 524 will detect some problems due to the FM and/or PM related event (here fault) in NE 523. However, they shall suppress sending FM and/or PM related data like alarms also here because they have knowledge about the problems at master entity NE 523 (and can deduct consequences for themselves) due to the FM and/or PM related messages (here alarm messages) sent to them by the master entity NE 523.

FIG. 5b presents an implementation of FM and/or PM in a management network in a communications system according to a further embodiment, where master-slave-relationship is exploited and where a FM and/or PM related event like a fault occurs at a slave entity. The situation is similar to the situation presented in FIG. 5a. The NE 523 is a master entity and has master-slave-relationships to the slave entities NE 522 and 524. However, here, a FM and/or PM related event (a fault, for example) occurs not at the master entity 523 but at the slave entity 522. In this situation, according to the present embodiment, the slave entity 522 sends corresponding FM and/or PM related data (like alarm) to the master entity 523. The master entity 523 receives this data and correlates it with its own FM and/or PM related data (occurred as reaction or in response to the FM and/or PM related event), and transmits the correlated data in form of a single message to the corresponding managing EMS 511 of the next management level 551. According to the present embodiment, the slave entity NE 522 shall not send itself FM and/or PM related data (here alarm) northbound, as it is the case in a conventional FM and/or PM. The master entity NE 523 combines the FM and/or PM related data (here faults or alarms respectively) with its own FM and/or PM related event or FM and/or PM related data respectively to a single FM and/or PM related message (here alarm message), and transmits then this FM and/or PM related message northbound.

Thus, in summary, according to the embodiments presented above, the policy is as follows: for the peer-to-peer case, the NE, where the original FM and/or PM related event (e.g. fault) occurs, sends a combined FM and/or PM related message (e.g. alarm message) northbound to the corresponding EMS. For the master-slave case, the master entity is always responsible for sending or transmitting such a combined FM and/or PM related message (here alarm message) or correlated data, respectively.

Figure 1:
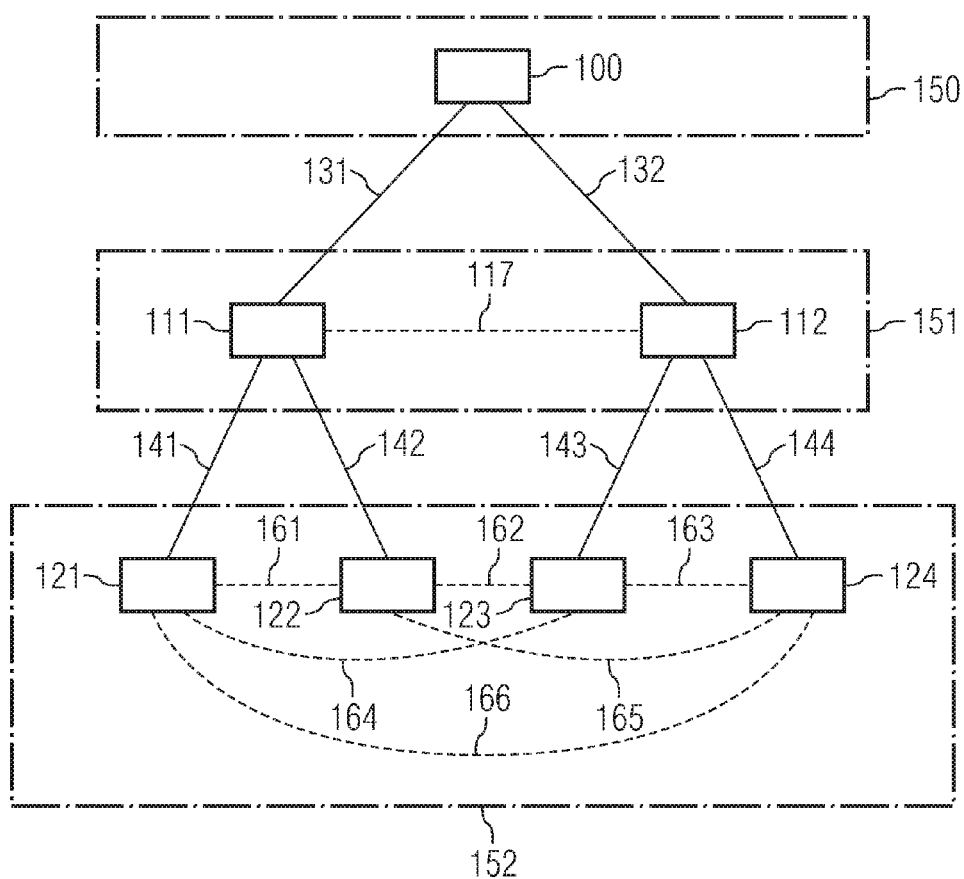
FIG. 1 presents a design of a conventional management network in a communications system.

It has to be noted, that the described methodology can be similarly performed also at other levels of the management hierarchy, e.g., at the inter-EMS level (cf. FIG. 1). Here, the description of embodiments of FIGS. 4, 5a, and 5b can be simply be changed by replacing the network entities "NE" by "EMS", and by replacing the original "EMS" by "OSS". Further, within this scope, it has to be noted that the indicated FM and/or PM related events like faults typically do not occur at the EMS itself but will be mostly triggered or caused by a message from the underlying NE level.

The embodiments introduced above could, thus, can be implemented as follows.

In a handover relationship, corresponding to the above described master-slave-relationship, where FM and/or PM related event like a fault occurs at a master entity, the following situation could occur. A cell (CELL_B) has a problem and goes out of service. A Radio Network Controller RNC (RNC_A) of an another cell (CELL_A) should initiate no handover any more from CELL_A to CELL_B. Based on the available knowledge on the CM relationships, only the RNC (RNC_B) of the cell CELL_B reports the overall problem to the EMS. RNC_A does not emit FM and/or PM related data like alarms. It is informed by RNC_B about the problems with CELL_B via a Iur-Link of the corresponding CM relationship.

Similarly, link termination points can be seen as an adequate example of the above described peer-to-peer-relationship. In this situation, the network element (NE_B) cannot properly provide the link termination point (LTP_B) any more. From the CM relationship NE_B knows that it is interacting with a further network element (NE_A) and that it is therefore beneficial to inform the EMS about the problem at both NE_B and NE_A. NE_A shall not send FM and/or PM related data like an alarm. It is informed directly by the NE_B about the problems with LTP_B by a message sent on the direct communications link between NE_A and NE_B constituted by the existing CM relationship.

With regard to the above description and embodiments, some more concrete embodiments will be provided with regard to the exploiting of existing CM relationships to enable the implementation of the FM and/or PM. Here, it has to be noted, that a person skilled in the art may readily apply the present invention also to further more concrete or alternative embodiments, not explained below for the reason of variety of possible concrete cases and situations.

In 3rd Generation Partnership Project (3GPP) a new network architecture is currently being standardized (Long Term Evolution, System Architecture Evolution). This architecture features a direct interface (X2) between the radio base stations called "eNodeBs". The eNodeBs take the handover decisions and require hence information about cells managed by other eNodeBs leading to master-slave-relationships between cell data sets in different eNodeBs. According to the present embodiment, if a first cell managed by a first eNodeBs has a problem and goes out of service, a second eNodeBs managing a second cell being adjacent to the first cell would initiate no handovers to the first cell. This would be done by sending a respective alarm from the first eNodeBs to the second eNodeBs by a direct communications link connecting the first eNodeBs and the second eNodeBs. For the sending purpose, the direct interface X2 (implemented on the direct communications link) could be used.

A further embodiment concerns the current network architecture of 3GPP comprising an Iur link between different RNCs. There, the Iur link could be used to exchange or send alarms and performance data. The target RNCs would be identified or determined by use of the corresponding CM relationships. Thus, if a FM and/or PM related event like a fault would occur at a first or sending RNC, the first or sending RNC would send FM and/or PM related data (here, for example, alarms and performance data) to at least one further or receiving RNC via the direct lur link, wherein the data would be send only to RNCs being involved in the corresponding CM relationship.

The following embodiment concerns the current 3GPP network management architecture comprising a management interface between element managers or EMS, respectively, in this 3GPP network. Element managers/EMS have knowledge about CM relationships and, thus, are able to exchange alarms and performance data based on this information. Thus, if a fault or an another FM and/or PM related event would occur in a first element manager, the first element manager would send an appropriate FM and/or PM related data (alarms, parameters, for example) just to the element managers involved in the corresponding CM relationship by use of the direct management interface between the element managers.

In summary, an operating of network entities in a communications system is provided, wherein said communications system comprises a management network with agent and management levels, wherein a fault and/or performance management related data provided or occurring in an agent level is correlated and/or analyzed in said agent level with further fault and/or performance management related data provided or occurring in said agent level by use of configuration management relationships in said agent level, and wherein an information derived from the correlation is transmitted to at least one management level of said management network of said communications network being responsible for management of the corresponding agent level.

It is noted that the present invention is not restricted to the above embodiments but can be applied in connection with any communications system comprising a management network with several managing levels and in which the operation and maintenance functionality comprising CM, FM, and/or PM is implemented. The embodiments may thus vary within the scope of the attached claims.

The invention claimed is:

1. A method of operating network entities in a communications system, said communications system comprising a management network comprising agent and management levels, the agent and management levels being disposed at respectively different hierarchical levels within the management network and having between them an operation, administration, and maintenance interface for the exchange of operation, administration, and maintenance related data, the agent level being contained within the communications system, and the communications system being configured to provide radio communication with subscriber terminals, wherein the communications system is a distinct entity from the subscriber terminals, and wherein the communications system communicates with the subscriber terminals via radio connections, the method comprising:

correlating in an agent level at least one of fault or performance management related data provided in said agent level with at least one of further fault or performance management related data provided in said agent level by use of configuration management relationships in said agent level, the configuration management relationships indicating network entities between which the at least one of fault or performance management related data is to be transferred, wherein one of the network entities at the agent level combines its own at least one of fault or performance management data with the at least one of fault or performance management data of another of the network entities at the agent level; and transmitting information derived from the correlation to a management level of said management network of said communications network, wherein the information is a combination of the at least one of fault or performance management related data and the at least one of further fault or performance management related data.

2. The method according to claim 1, wherein said fault and/or performance management related data and said at least one of further fault or performance management related data is correlated at one network entity of said agent level, and wherein said information derived from the correlation is transmitted by said one network entity to said management level.

3. The method according to claim 2, wherein said one network entity has at least one configuration management relationship to said at least one further network entity in said level.

4. The method according to claim 3, wherein said at least one configuration management relationship is a peer-to-peer-relationship.

5. The method according to claim 4, wherein said one network entity is a network entity at which at least one of fault or performance management related event occurs, wherein said at least one of fault or performance management related event is a direct cause of said at least one of fault or performance management related data, and wherein said at least one of further fault or performance management related data is sent to said one network entity by said at least one further network entity in response to said at least one of fault or performance management related event.

6. The method according to claim 3, wherein, if said at least one configuration management relationship is a master-slave-relationship, said one network entity is a master entity of the master-slave-relationship.

7. The method according to claim 6, wherein, if at least one of fault or performance management related event occurs at said master entity and said at least one of fault or performance management related event is cause of said at least one of fault or performance management related data and said at least one of further fault or performance management related data, said at least one of further fault or performance management related data is sent to said master entity by said at least one further network entity in response to said at least one of fault or performance management related event.

8. The method according to claim 6, wherein, if at least one of fault or performance management related event occurs at said at least one further network entity being a slave entity of said master entity and said at least one of fault or performance management related event is cause of said at least one of fault or performance management related data and said at least one of further fault or performance management related data, said slave entity sends said at least one of further fault or performance management related data to said master entity.

9. The method of claim 1, further comprising:
managing a first cell via a first base station; and
managing a second cell via a second base station, wherein the second cell is adjacent to said first cell,
wherein the first and second base stations have a direct communication link therebetween.

10. The method of claim 9, wherein each of the first and second base stations takes handover decisions and requires information about one of the first and second cells managed via the other base station.

11. The method of claim 9, further comprising:
sending an alarm from the first base station to the second base station via the direct communication link when the first base station has a problem; and
managing the second base station to initiate no handovers to the first cell when the second base station receives the alarm from the first base station.

12. A computer program product comprising software code embedded in a non-transitory computer readable medium that, when executed on a computing system, causes the computing system to perform a method of operating network entities in a communications system, said communications system comprising a management network comprising agent and management levels, the agent and management levels being disposed at respectively different hierarchical levels within the management network and having between them an operation, administration, and maintenance interface for the exchange of operation, administration, and maintenance related data, the agent level being contained within the communications system and the communications system being configured to provide radio communication with subscriber terminals, wherein the communications system is a distinct entity from the subscriber terminals, and wherein the communications system communicates with the subscriber terminals via radio connections, the method comprising:
correlating in an agent level at least one of fault or performance management related data provided in said agent level with at least one of further fault or performance management related data provided in said agent level by use of configuration management relationships in said agent level, the configuration management relationships indicating network entities between which the at least one of fault or performance management related data is to be transferred, wherein one of the network entities at the agent level combines its own at least one of fault or performance management data with the at least one of fault or performance management data of another of the network entities at the agent level; and
transmitting an information derived from the correlation to a management level of said management network of said communications network, wherein the information is a combination of the at least one of fault or performance management related data and the at least one of further fault or performance management related data.

13. A network entity for operation in an agent level of a management network of a communications system, wherein said network entity comprises:
an operation, administration, and maintenance interface configured to exchange operation, administration, and maintenance related data link with a management level, the agent and management levels being disposed at respectively different hierarchical levels within the management network;
an agent level interface configured to receive at least one of fault or performance management related data provided in said agent level from another network entity by use of at least one configuration management relationship in said agent level;
a processor configured to correlate said at least one of fault or performance management related data with at least one of own fault or performance management related data occurring in said agent level
a processor configured to combine at the agent level at least one of own fault or performance management data with the at least one of fault or performance management data of the another network entity; and
a transmitter configured to transmit an information derived from the correlation to the management level of said management network of said communications network, wherein the information is a combination of the at least one of fault or performance management related data and the at least one of own fault or performance management related data,
wherein the agent level is contained within the communications system and wherein the communications system is configured to provide radio communication with subscriber terminals,
wherein the communications system is a distinct entity from the subscriber terminals, and wherein the communications system communicates with the subscriber terminals via radio connections.

14. The network entity according to claim 13, wherein, if said at least one configuration management relationship is a peer-to-peer-relationship and said network entity is a network entity at which at least one of fault or performance management related event occurs, said network entity is configured to receive said at least one of fault or performance management related data from at least one further network entity of said agent level having said peer-to-peer-relationship with said network entity.

15. The network entity according to claim 13, wherein, if said at least one configuration management relationship is a master-slave-relationship, said network entity is a master entity of said master-slave-relationship.

16. The network entity according to claim 15, wherein, if at least one of fault or performance management related event occurs at said network entity, said network entity is configured to receive said at least one of fault or performance management related data from at least one further network entity of said agent level having said master-slave-relationship with said network entity.

17. The network entity according to claim 15, wherein, if a at least one of fault or performance management related event occurs at a further network entity of said agent level, said further network entity being a slave of said network entity, said network entity is configured to receive said at least one of fault or performance management related data from said further network entity.

* * * * *